Patented Nov. 11, 1952

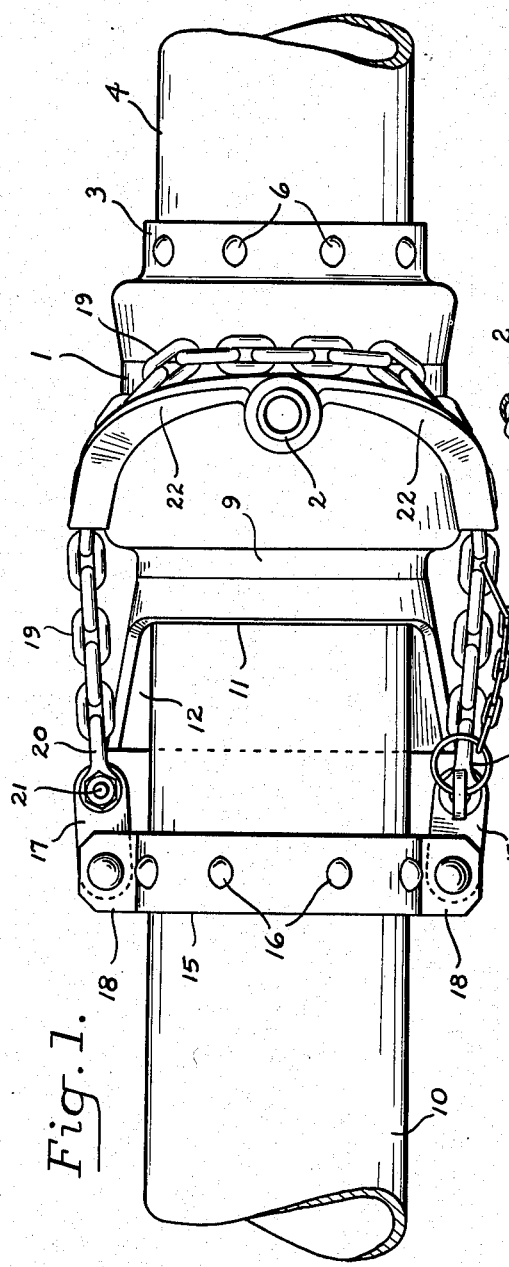
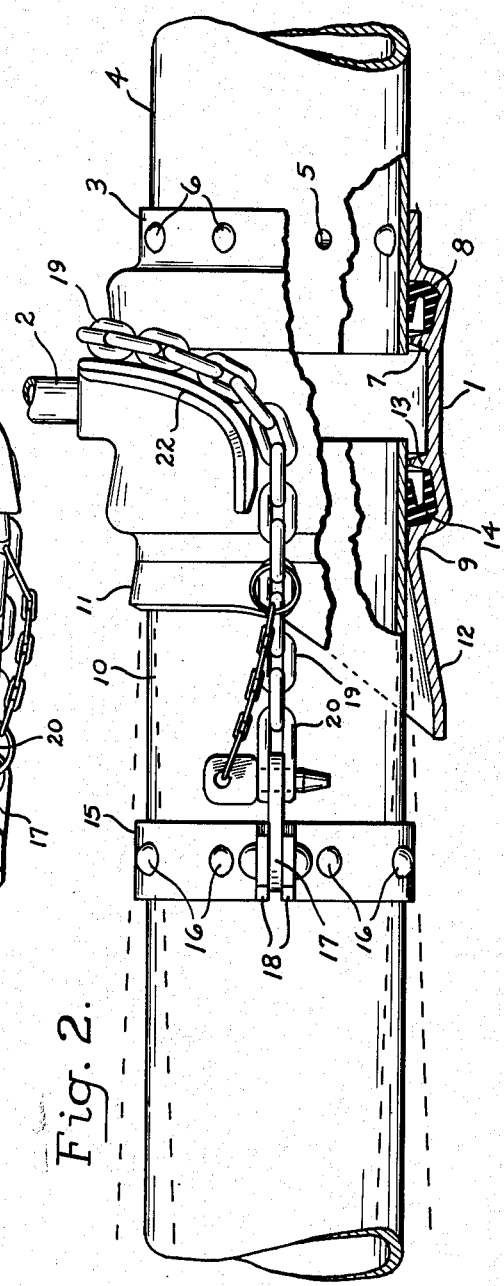

2,617,667

UNITED STATES PATENT OFFICE 2,617,667

IRRIGATION PIPE COUPLER

William H. Stout and Wyatt W. Stout, Portland, Oreg., assignors to Farmland Irrigation Company, Inc., a corporation of California Application June 22, 1948, Serial No. 34,368

2 Claims. (Cl. 285—163)

Our invention relates to pipe couplers for sectional irrigation pipes and is particularly concerned with the provision of novel coupling means by which said irrigation pipe sections may be joined securely, and yet, through the use of flexible bail-like means, may be afforded universal articulation adjacent said coupling means.

A principal object of our invention is the provision of a flexible bail-like member constructed and arranged releasably to join a coupler secured to one length of pipe with a band secured to an adjacent length of pipe whereby said latter pipe may have free universal pivotal movement with respect to said coupler.

Another object is to provide a coupler for joining sections of irrigation pipe, said coupler having formed thereon a projecting shoulder proportioned and arranged to be engaged by a flexible bail for releasably securing said sections of pipe to have longitudinal communication.

A further object is the provision of a pipe coupler adapted to be secured at one end to one section of pipe, the opposite end of said coupler being flared outwardly about its periphery, a portion thereof being extended to form an arcuate base by which a second section of pipe may be guided into said flared opening for pivotal connection with said coupler.

These and other objects and advantages of our invention will appear from the following detailed description taken in connection with the accompanying drawing, in which:

Fig. 1 is a fragmentary plan view showing the coupler and flexible link connection embodying our invention, joining two sections of irrigation pipe; and Fig. 2 is a fragmentary side elevation of the structure shown in Fig. 1 with parts of the pipes and coupler shown broken away to disclose the construction thereof.

The coupler embodying our invention comprises a substantially tubular housing 1 constructed preferably of light metal, such as aluminum. Projecting outwardly from the wall of said housing is a small pipe 2 on which a sprinkler head may be mounted for use in irrigating the area of land adjacent said head. One end 3 of the tubular housing 1 terminates in a circular collar of smaller diameter than that of the remainder of said housing. The inside diameter of said collar is substantially the same as the outside diameter of the irrigation pipe 4 which is received through said collar for attachment to the coupler. The collar and irrigation pipe are provided with registering holes 5 spaced at intervals about their respective circumferences to receive rivets 6 or other fastening devices therethrough by means of which the pipe and coupler are positively joined. In place of rivets, or similar fastening devices, the pipe and coupler may be joined by welding, if preferred.

An annular ring 7 extends circumferentially within the inner wall of the housing 1 in spaced relation with the end terminating in collar 3. Said ring forms an inner retainer for a resilient rubber gasket 8 which is disposed in the annular cavity formed between the ring 7 and collar 3. Said gasket fits closely about the irrigation pipe 4 to provide a water seal between the pipe and collar.

Adjacent the opposite end of the tubular housing is a similarly constricted, narrow annular collar 9 through which an adjacent section of irrigation pipe 10 is slidably received. The collar 9 is extended longitudinally and is flared outwardly in the form of a truncated tubular cone 11. The lower portion of said cone, i. e. the portion diametrically opposite the sprinkler head outlet 2, is extended further and forms an arcuate base 12 by which the coupler may be positioned upon the ground. The base 12 and cone 11 afford means by which the pipe 10 may conveniently be guided into engagement with the coupler. That is, the end of the pipe 10 may be rested upon the base 12 and pushed toward the collar 9. The flared end 11 centers the pipe in the opening automatically as it is thrust toward the collar.

A second annular ring 13 similar in construction and function to ring 7 extends circumferentially within the inner wall of the tubular housing 1 in spaced relation with collar 9. The annular cavity formed between said ring and collar also receives a resilient rubber gasket 14 which provides a tight water seal between the pipe 10 and the collar 9. Ring 13 has an inner diameter greater than the outer diameter of the irrigation pipe which extends therethrough, thus permitting the latter to rotate in universal movement with respect to the coupler. In this manner a series of pipes 4 and 10 may be joined articulately, permitting said joined sections to follow the contour of uneven terrain and to extend about obstacles upon and irregularities of the ground. In referring to a series of pipes 4 and 10, it is understood that a coupler is provided at one end of each section of pipe and adjacent sections are joined in the manner illustrated in the drawing and described herein. It is to be noted that the adjacent ends of pipes 4 and 10 are spaced apart, lying on opposite sides of the central opening communicating with the sprinkler head pipe 2.

When water is transmitted under pressure through a series of pipes joined in the manner described above, the pressure impressed at the coupler tends to force the pipes longitudinally away from each other. Since the coupler is secured firmly to pipe 4, it is apparent that only pipe 10 is capable of longitudinal movement with respect to the coupler. Accordingly, pipe 10 may, if unrestrained, be removed completely from engagement with the coupler. It is necessary, therefore, that some form of latch be provided in order releasably to secure the pipe 10 to the coupler while water is being transmitted through the system. Such latching device must, however, be so constructed and arranged as to permit freedom of universal movement between the sections of pipe as discussed hereinbefore. The latching mechanism now to be described fulfills these requirements simply and easily.

A metal band 15 is secured, as by rivets 16 or by welding, about the irrigation pipe 10 at a predetermined distance from the end which is slidably received in the coupler. Links 17 are pivotally secured between flanges 18 which project outwardly from opposite sides of said band. The pipe 10 is arranged in the coupler in such manner that the links 17 are parallel with the ground, i. e. they pivot about a vertical axis. A length of chain 19, or other flexible material such as rope or cable, constituting a flexible tension member, is secured at its ends to said links through clevises 20. A removable pin or bolt 21 is used to join the clevis and link, thereby permitting detachment of the chain when the pipes are to be disassembled.

A projecting shoulder 22 is formed on the tubular housing 1. Said shoulder extends substantially one-half the circumference of said housing equal distances on either sides of the sprinkler head pipe 2. The shoulder extends from the side of said sprinkler head pipe opposite the metal band 15, or the flared cone 11, and bends forwardly at its ends in a smooth sweep toward said cone as it extends downwardly about the periphery of the coupler. At its terminal ends said shoulder is disposed slightly above the horizontal plane extending through the longitudinal center line of said coupler. The chain 19 is extended from its terminal ends to loop about said shoulder 22, thereby forming a bail-like member which detachably joins the irrigation pipe 10 to the coupler.

In assembly of the pipe sections, one section of pipe 4 is laid upon the ground with the coupler facing the direction in which the irrigation line is to be projected. The arcuate base 12 provides a footing upon which the pipe is positioned upon the ground. Pipe 2 thus extends vertically upward correctly to position the sprinkler head which is to be attached. The end of pipe 10 adjacent the band 15 is then placed upon the base 12 and pushed toward the flared opening defined by the cone 11. The pipe slides through the cone and is forced through the tightly fitting gasket 14 disposed between the collar 9 and annular ring 13. The chain 19 is then drawn about the shoulder 22 and is secured to the second link 17 by means of its cooperating clevis 20 and bolt 21.

An important feature of our invention resides in the fact that the flexible chain 19 permits articulation between the coupler and pipe 10. Referring to Fig. 1 of the drawing, it is apparent that when, for example, the end of pipe 10 is pivoted downwardly in the plane of the paper about its pivot point at gasket 14, the chain 19 slides longitudinally along the shoulder 22 in a counterclockwise direction to accommodate the change in position of the end links 17. Since the overall length of the chain remains constant, the pipe 10 is prevented from moving longitudinally out of the coupler. The same result is obtained when the pipe 10 is moved upwardly in the plane of the paper, the direction of movement of the chain along the shoulder 22 being reversed, of course.

Referring now to Fig. 2, when pipe 10 is rotated downwardly in the plane of the paper about the gasket 14 as a pivot, the chain follows the movement of the pipe and restricts longitudinal displacement of the latter. Similarly, when the pipe is moved upwardly in the plane of the paper, the chain bends about the ends of the shoulder 22 in following the movement of the pipe. In so doing, the chain becomes tighter and draws the end of pipe 10 slightly further into the coupler.

It is clear that the flexible bail-like member 19 permits articulation between pipe 10 and the coupler in any direction. Additionally, slight relative rotation between said pipe and coupler is accommodated by the flexibility of the chain. Thus, ample universal movement of the pipe with respect to the coupler is provided in addition to preventing relative longitudinal displacement or disengagement of said parts.

We claim:

1. A pipe coupler comprising a flexible tension member, means for anchoring said member to diametrically opposite points on a pipe section, a tubular housing having a straight axis adapted to receive an end of said pipe section for universal movement therein, and means for slidably retaining said flexible tension member in engagement with said housing comprising an exterior shoulder on said housing extending from one point thereon along a path which is generally arcuate viewed in plan, to a second point substantially diametrically opposite said one point.

2. A pipe coupler according to claim 1 in which the face of said shoulder engaged by said tension member is curved from a plane paralleling the axis of said tubular housing at the ends of said shoulder to a plane normal to the axis of said housing at the mid-point of said shoulder.

WILLIAM H. STOUT.
WYATT W. STOUT.

REFERENCES CITED

The following references are of record in the file of this patent:

UNITED STATES PATENTS

| Number | Name | Date |
|---|---|---|
| 213,278 | Campbell | Mar. 18, 1879 |
| 656,956 | Eibee | Aug. 28, 1900 |
| 924,368 | Nelson | June 8, 1909 |
| 1,871,810 | Lester | Aug. 16, 1932 |
| 2,086,376 | Bock | July 6, 1937 |
| 2,278,074 | Hauf | Mar. 31, 1942 |
| 2,449,735 | Wyss | Sept. 21, 1948 |
| 2,451,437 | Fenlon | Oct. 12, 1948 |